(No Model.)
A. W. KIRSCH-KING.
METAL JOINT.
No. 563,184. Patented June 30, 1896.
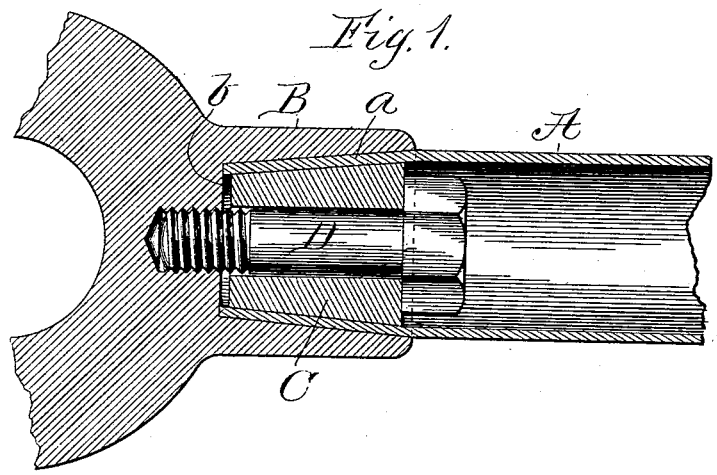
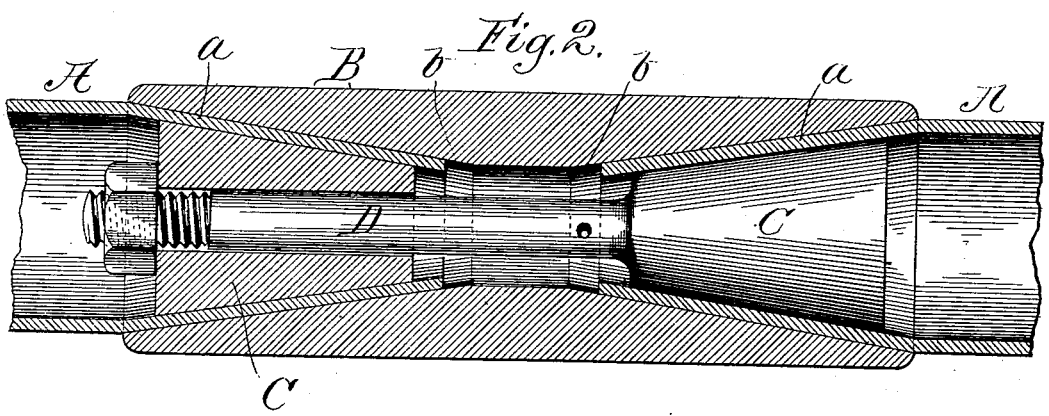
Witnesses
John W. Adams
Louis H. F. Whitehead
Inventor
Albert W. Kirsch-King.
by Dayton, Poole & Brown
his Attorneys

UNITED STATES PATENT OFFICE.

ALBERT W. KIRSCH-KING, OF CHICAGO, ILLINOIS.

METAL JOINT.

SPECIFICATION forming part of Letters Patent No. 563,184, dated June 30, 1896.

Application filed December 16, 1892. Serial No. 455,362. (No model.) Patented in England January 31, 1893, No. 2,117.

*To all whom it may concern:*

Be it known that I, ALBERT W. KIRSCH-KING, of Chicago, in the county of Cook and State of Illinois, have invented certain new and useful Improvements in Metal Joints; and I do hereby declare that the following is a full, clear, and exact description thereof, reference being had to the accompanying drawings, and to the letters of reference marked thereon, which form a part of this specification.

This invention has for its object to provide a joint for rigidly uniting metal parts of bicycles and other machines and structures, which joint combines great strength with easy juncture and equally easy detachability, the said invention having heretofore been patented to me in Great Britain, under date of January 31, 1893, Patent No. 2,117.

Describing the invention with reference to the accompanying drawings, Figure 1 of said drawings illustrates the invention applied to the junction of a metal tube with a socketed member of a structure. Fig. 2 illustrates the invention applied to the junction of two tubes with a surrounding sleeve or other apertured member of a structure.

A represents a tube, or a member of other character having a hollow or tubular extremity $a$, which extremity is tapered outwardly, as shown.

B represents a member which in Fig. 1 has a socket, and in Fig. 2 an aperture $b$, and to which the member A is to be joined. The socket or aperture $b$ in the member B is tapered inwardly to fit the external surface of the tapered portion $a$ of the member A, which is inserted therein. Within the tapered portion $a$ of said member A is fitted a wedge C, which has its larger end inward and corresponds in external form with the interior of the part $a$, said wedge, the part $a$, and the socket or aperture $b$ being, in the present instance, conical, though they may be polygonal.

The upwardly-tapering extremity $a$ of the member A being inserted into the tapering orifice $b$ of the member B, so as to bear closely against the sides of said orifice, and the wedge C being arranged with its taper in the same direction as that of the tube and being forced in the direction of its smaller end, the metal of the member A surrounding said wedge will be expanded against the walls of the orifice in the member B with the effect of holding the parts together securely. On the other hand, by retracting or driving out the wedge C the parts A and B may be readily separated.

As a convenient means for forcing and holding the wedge C, the screw D is shown, which, in Fig. 1, passes through an axial opening in the wedge C and enters a tapped orifice in the member B.

In Fig. 2 (wherein the construction is essentially a duplication of the joint shown in Fig. 1) two wedges are employed, one for each of the hollow parts A A, and a single screw-bolt is made to tighten and hold both wedges. One of the wedges is shown as integral with the shank of the screw D and the other apertures to give passage for said shank, upon the extremity of which is fitted the nut D', but both wedges can be apertured and a separate bolt employed, if desired. The forms of the tightening and holding devices here shown call for tubular members A, through which the nuts on such tightening devices may be reached, but in Letters Patent No. 490,876, granted to me January 31, 1893, other forms of the tightening devices are shown in other adaptations of a similar joint, which other forms may, in corresponding adaptations, be employed instead of those here illustrated. In said prior patent the hollow member A has its inserted extremity of uniform diameter, as, for example, cylindrical, and in that case a split cylindro-conical bushing is employed between the wedge and the surrounding hollow part. The present invention is in the nature of an improvement upon such construction in that it dispenses with said bushing, and it is to be understood that the same variations may be made in the details of this form of the joint as in the other without departure from the invention.

If desired, the inserted part $a$ of the member A may, in the present construction, be provided with an open lengthwise slot or slots, as shown in said prior application as to the cylindric portion of the same member with a view to facilitating its expansion, but ordinarily this will not be necessary inasmuch as the said taper $a$, when without a slot, may be, in the first instance, forced into snug bearing against the walls of the socket or aperture $b$, and may then be further and sufficiently expanded by action of the interior wedge to give absolute security to the joint.

I claim as my invention—

In a union for uniting a tubular member with a socketed member, the combination of a member provided with a socket closed at its inner end and of uniform or inwardly-decreasing diameter, a second member provided with a tubular end adapted to fit in said socket and the exterior of which conforms in shape to the interior of the socket, a wedging member arranged longitudinally within said tubular end of said second member within the socket, with its smaller end directed toward the first member, and a screw-threaded bolt or wedge-actuating member connected with the wedge and arranged to extend longitudinally through the socket and engage a threaded aperture in the first member, whereby the wedge may be forcibly drawn into the socket and the tubular member held within the socketed member solely by frictional engagement, substantially as set forth.

In testimony that I claim the foregoing as my invention I affix my signature in presence of two witnesses.

ALBERT W. KIRSCH-KING.

Witnesses:
M. E. DAYTON,
C. CLARENCE POOLE.